United States Patent [19]

Kovac

[11] Patent Number: 4,691,657
[45] Date of Patent: Sep. 8, 1987

[54] AMPHIBIOUS VEHICLE

[76] Inventor: Andrew J. Kovac, 4474 Shelby Crescent, Mississauga, Ontario, Canada, L4W 3T3

[21] Appl. No.: 885,844

[22] Filed: Jul. 16, 1986

[51] Int. Cl.⁴ ............................................. B63B 1/00
[52] U.S. Cl. ...................................... 114/61; 114/270
[58] Field of Search ................. 114/61, 270; 280/414; 296/23 B, 23 R

[56] References Cited

U.S. PATENT DOCUMENTS 3,172,134  3/1965  Linvingstone ..................... 114/61
4,048,685  9/1977  Gail ................................... 114/61

Primary Examiner—Jeffrey V. Nase
Assistant Examiner—Jesûs D. Sotelo
Attorney, Agent, or Firm—Ridout & Maybee

[57] ABSTRACT

An amphibious vehicle is provided with a watertight hull and pontoons for flotation of the vehicle in a body of water. At least one pontoon is positionable along each side of the vehicle. At least two pivoting arms are associated with each laterally extending pontoon for the purpose of moving each pontoon from a stowed position atop the vehicle to an operating position laterally alongside the vehicle. Each arm has one end attached to the pontoon and the other end is provided with means for moving the arm approximately 180° about a pivot so that the pontoon may be moved into the desired position.

2 Claims, 2 Drawing Figures

AMPHIBIOUS VEHICLE

The present invention relates to an amphibious vehicle which may be a trailer or a motorized land vehicle which is provided with pontoons giving flotation assistance to the vehicle when it is in a body of water. The pontoons of the present vehicle are movable from a stowed position atop the vehicle to an operating position alongside the vehicle.

Accordingly, the invention provides an amphibious vehicle which comprises a frame provided with wheels for transporting the vehicle on land. A body is attached to the frame having a watertight lower portion enabling the vehicle to float in a body of water. The vehicle is equipped with pontoons to provide flotation in a body of water. At least one pontoon is positionable along each side of the vehicle. At least two pivoting arms are associated with each laterally extending pontoon for the purpose of moving each pontoon from a stowed position atop the vehicle to an operating position laterally alongside the vehicle. Each arm has one end attached to the pontoon and the other end is provided with means for moving the arm approximately 180° about a pivot so that the pontoon may be moved into the desired position.

Figure 1:
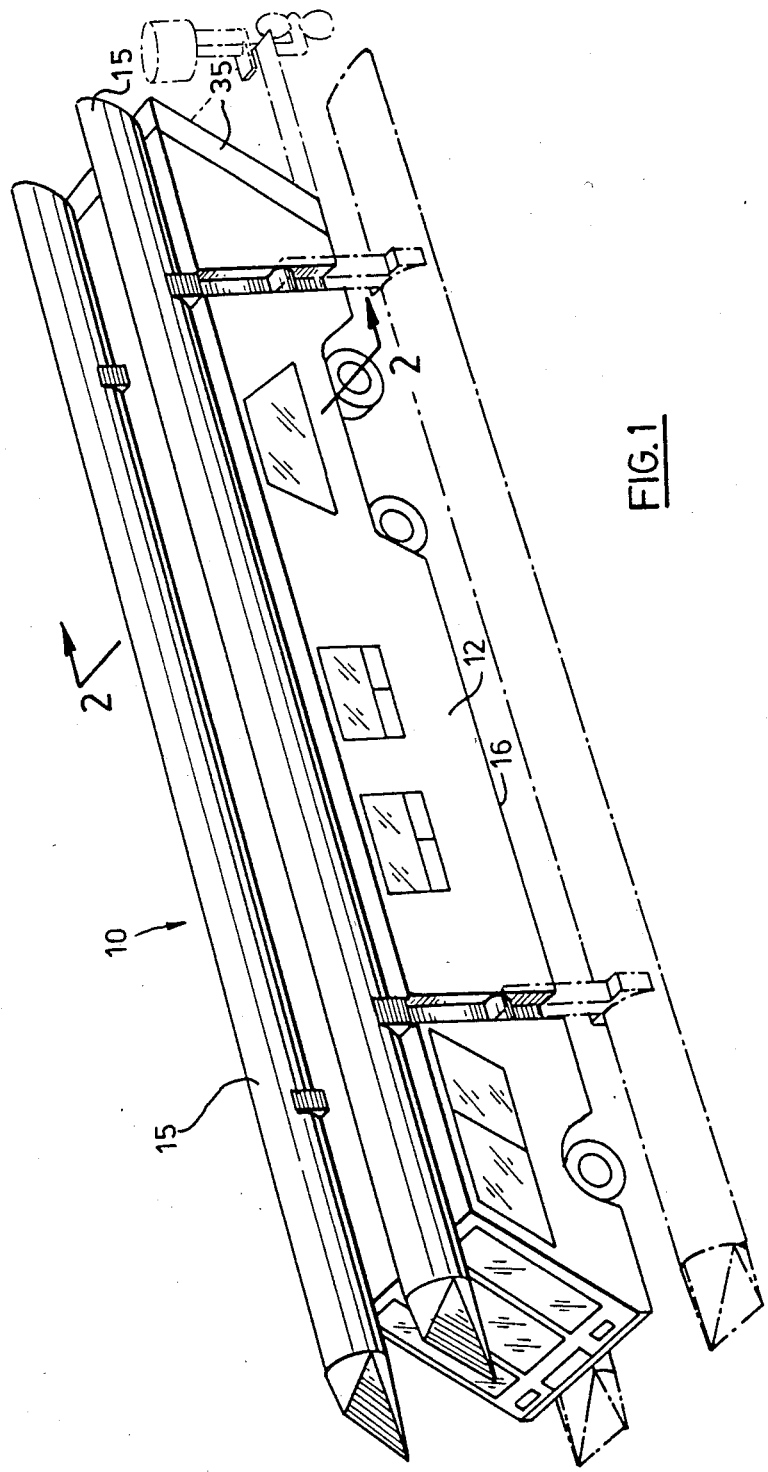
FIG. 1 is a perspective view of a vehicle showing the alternative positions of the pontoons.

An amphibious vehicle 10 in accordance with the present invention is shown in FIG. 1 as a motorized recreational vehicle, but the invention may extend to a trailer or other type of non-motorized land vehicle. The vehicle 10 has a watertight lower body portion 12 which allows the vehicle to float in water. Pontoons 15 are provided laterally along each longitudinal side 16 of the vehicle 10 to serve as the principal means of flotation and stability for the vehicle 10 when it is afloat. The pontoons 15 are shown in the drawings as elongate generally cylindrical members, but as will be clear to those skilled in this art, the pontoons 15 may comprise any of a number of configurations or structures suitable for the purpose of floating and stabilizing the vehicle 10 in a body of relatively calm water.

Figure 2:
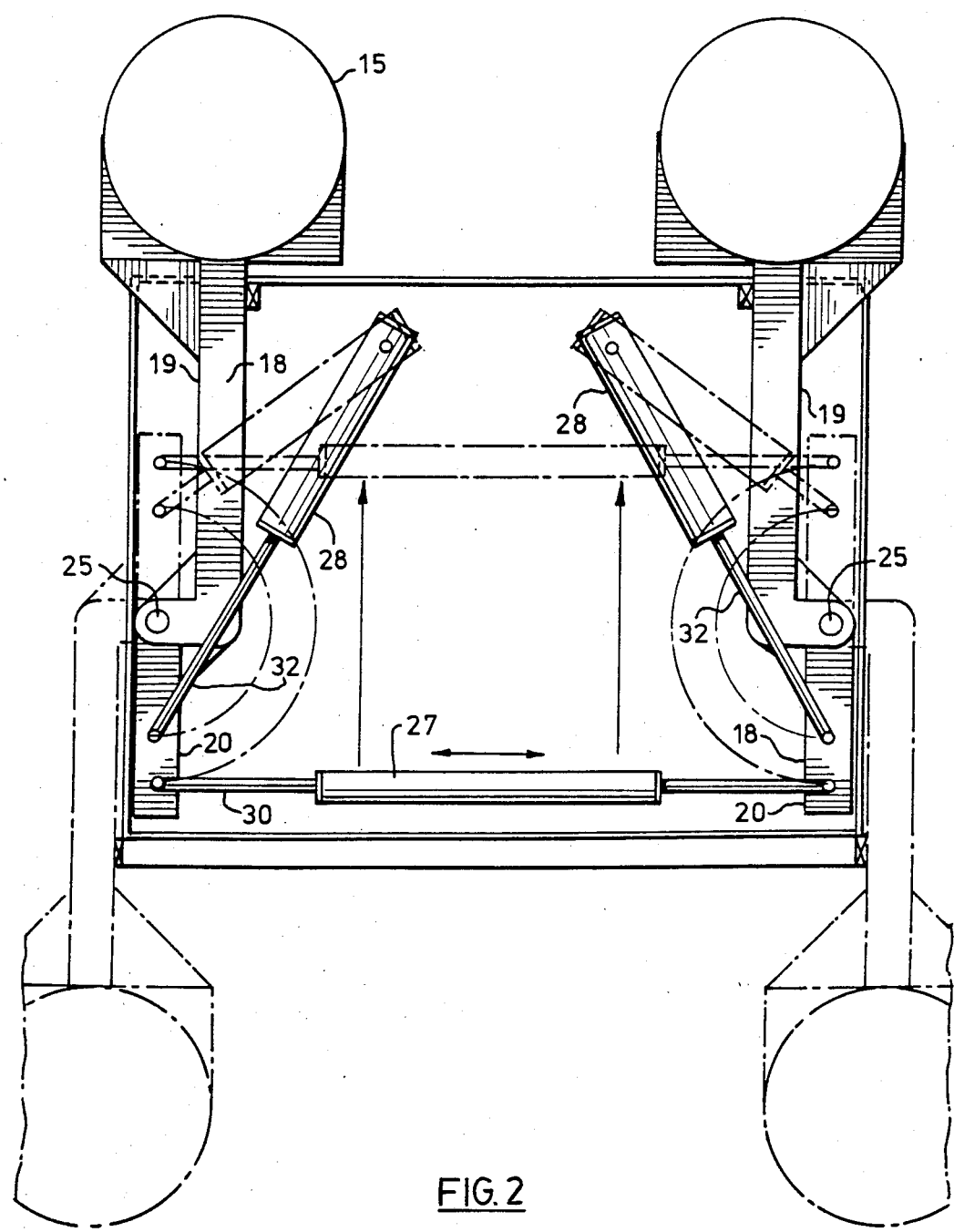
FIG. 2 is a sectional detail showing the preferred mechanism for moving the pontoons from the stowed to the operational positions.

The mechanism for moving the pontoons 15 from a stowed position atop the vehicle 10 to an operational position alongside the vehicle 10 is shown in FIG. 2. Each pontoon 15 is attached to one end of an arm 18 which is pivotable about a pivot 25 with the assistance of mechanical means such as hydraulic or pneumatic cylinders 27 and 28. Each arm 18 comprises a long section 19 attached to the pontoon 15 and a short section 20. The sections 19 and 20 are defined about the pivot 25 and may comprise a unitary structure or separate pieces joined together. As shown in FIG. 2, the arms 18 are preferably shaped with two 90° bends at the area of the pivot 25 so that the pontoons 15 may be located properly upon movement of the arms 18 through 180°.

While there may be several workable arrangements of the cylinders 27 and 28 in relation to the arms 18, the preferred arrangement shown in FIG. 2 provides for a double hydraulic cylinder 27 having actuatable piston rods 30 extending from each end of the cylinder 27 and attached pivotally near the end of the short arm section 20 of each opposing arm 18. Single cylinders 28 have piston rods 32 pivotally attached to each short arm section 20, preferably centrally thereof, with the other end of each cylinder 28 being pivotally located at a suitable angle with respect to the arm 18 so that the cylinder 28 can apply force to the arm 18 substantially throughout the complete 180° range of movement of the arm 18. As shown in FIG. 1, there should be at least two arms 18 and accompanying mechanisms for each pontoon 15.

In operation the cylinders 27 and 28 work together to move the pontoons 15 smoothly from the stowed to the operational positions. In moving the pontoons 15 from the stowed position atop the vehicle 10, the cylinder 27 provides the initial primary motive force to pull the ends of the short arm sections 20 toward one another. Leverage about the pivot 25 causes the pontoons 15 to move off of the vehicle roof and gravity quickly begins to assist the descent of the pontoons 15 to the desired location alongside the vehicle 10. In the descent of the pontoons 15, the cylinders 28 act primarily to brake the downward motion of the pontoons 15 so that the lowering operation is smooth and controlled. Likewise, the cylinder 27 acts to counter the gravitational pull on the pontoons 15 as they descend from the stowed position. As the pontoons 15 enter the water, the cylinders 27 and 28 provide sufficient push on the short arm sections 20 to move the pontoons 15 into the operational positions.

In order to raise the pontoons 15 to the stowed location, the cylinders 27 and 28 act in unison first pulling, and then when at the point of full piston contraction, pushing the short arm sections 20 to move the pontoons 15 against the pull of gravity. The cooperation of the three cylinders 27 and 28 provides a smooth movement of the pontoons 15 from the operational to the stowed positions.

It will be apparent to the person skilled in this art that the smooth operation of the cylinders 27 and 28 will depend on the use of suitable control means for the cylinders 27 and 28. The control means comprise a series of hydraulic flow devices with the necessary sequencing and reference point switches to ensure a smooth and safe movement of the pontoons 15 between the operational and stowed positions. The control means may be electronically governed by means of a microcomputer or chip.

While the watertight lower body portion of the vehicle 10 may be employed to contribute to the buoyancy of the vehicle 10 when in the water with the pontoons 15 deployed, it is preferred to position the pontoons 15 so that they essentially lift the vehicle 10 out of the water. This feature allows the buoyancy of the vehicle body to act as a backup to the pontoons 15.

Conversion of the vehicle 10 from a land vehicle to an aquatic vehicle may be accomplished by driving the vehicle 10 into the water so that it may float by means of its watertight body 12, and then, causing the pontoons 15 to be deployed from the stowed positions atop the vehicle 10 to the operational positions alongside the vehicle 10. The pontoons 15 then provide the principal flotation means for the vehicle 10 which is lifted just out of the water by the pontoons 15. Propulsion of the waterborne vehicle 10 is accomplished by an inboard or outboard motor driven propeller or the like which may be lowered into an operational position when the vehicle 10 first enters the water. Conveniently, propulsion means as well as steering means such as a rudder may be located on a tailgate 35 of the vehicle 10 which may be lowered into the water at the appropriate time.

In this regard, it is preferred that the engine for the vehicle 10 be located toward the rear of the vehicle 10. This inboard engine may be used to power the vehicle 10 for propulsion both on land and in the water. Location of the engine toward the rear of the vehicle 10 is desirable in order to provide a good weight distribution throughout the vehicle 10. Attachment of one or more outboard motors to the lowered tailgate 35 may be used as a supplement to the propulsion provided by the inboard engine. Also, the outboard motors on the tailgate 35 can be used to steer the vehicle 10 in the water.

I claim:

1. An amphibious vehicle having a front, a rear and two sides, comprising:
   a frame provided with wheels for transporting the vehicle on land;
   a body attached to the frame, the body having a watertight lower portion enabling the vehicle to float in a body of water;
   pontoons for the vehicle to provide flotation of the vehicle in a body of water, the vehicle having at least one pontoon positionable laterally along each side thereof; and
   at least two pivoting arms for moving each laterally extending pontoon from a stowed position atop the vehicle to an operating position alongside the vehicle, each said arm having one end attached to the pontoon and the other end provided with means for moving the arm approximately 180° about a pivot so that the pontoon may be moved into the desired position, the means for moving the arm comprising at least three hydraulic cylinders situated in the vehicle to control the movement of two arms disposed opposite one another, each arm being attached to one of the pontoons, the three hydraulic cylinders comprising a double cylinder having a piston rod extending from each end thereof, each said piston rod being pivotally attached adjacent said other end of each opposing arm, and each arm having a cylinder with a piston rod thereof being pivotally attached centrally of the arm portion between the pivot for the arm and said other end thereof with the other end of the cylinder being pivotally located to enable the cylinder to apply force to the arm substantially throughout its 180° range of movement, said double cylinder and said cylinders associated with the opposing set of arms being operable in concert to move both arms simultaneously and smoothly through their 180° ranges of movement.

2. A vehicle as claimed in claim 1, further comprising a tailgate having at least one outboard motor attached thereto, the tailgate being lowered into the water when the vehicle is afloat to provide propulsion means therefor by way of the outboard motor.

* * * * *